United States Patent [19]

Nichols et al.

[11] Patent Number: 5,716,163
[45] Date of Patent: *Feb. 10, 1998

[54] CORRUGATED LEACHING CHAMBER WITH HOLLOW RIBBING

[75] Inventors: James M. Nichols, Old Saybrook; Roy E. Moore, Jr., Chester, both of Conn.

[73] Assignee: Infiltrator Systems, Inc., Old Saybrook, Conn.

[*] Notice: The term of this patent shall not extend beyond the expiration date of Pat. No. 5,401,459.

[21] Appl. No.: 402,111

[22] Filed: Mar. 10, 1995

Related U.S. Application Data

[63] Continuation of Ser. No. 956,602, Oct. 5, 1992, Pat. No. 5,401,459.

[51] Int. Cl.$^6$ ............................................. E02B 13/00
[52] U.S. Cl. ............................. 405/43; 405/36; 405/45
[58] Field of Search .................... 405/43–49, 118–126; 264/572; 138/172, 173, 177, 121, 122

[56] References Cited

U.S. PATENT DOCUMENTS

| | | | |
|---|---|---|---|
| D. 329,684 | 9/1992 | Gray | D23/207 |
| 3,122,888 | 3/1964 | Boening | 405/47 |
| 4,101,617 | 7/1978 | Frederich | 264/155 X |
| 4,136,220 | 1/1979 | Olabisi | 264/504 X |
| 4,145,387 | 3/1979 | Hegler et al. | 264/156 X |
| 4,234,642 | 11/1980 | Olabisi | 264/572 X |
| 4,759,661 | 7/1988 | Nichols et al. | 405/48 |
| 5,162,122 | 11/1992 | Loren | 264/572 X |

FOREIGN PATENT DOCUMENTS

| | | | |
|---|---|---|---|
| 40-5-208460 | 8/1993 | Japan | 264/572 |

OTHER PUBLICATIONS

Infiltrator—The Engineered System for Total Storm–Water Management, Brochure, 4 pp. Infiltrator Systems Inc 1989.
Gain—Gas Assisted Injection Molding, Brochure, 6 pp., Detroit Plastic Molding, Unknown Date.
Hancor Envirochamber, Advertisement, 1 p. Hancor Inc (1995).
K. C. Rusch, Gas assisted Injection Molding Technical paper, 8 pp., 1989.

*Primary Examiner*—Dennis L. Taylor
*Attorney, Agent, or Firm*—C. G. Nessler

[57] ABSTRACT

Large leaching chambers having hollow ribs are formed by gas assisted injection molding. The ribs have stepped cross sections with hollow bases and narrower solid upper parts. When the chamber wall is corrugated, as characterizes a typical arch shape cross section leaching conduit, hollow ribs on opposing sides of the wall are positioned to connect to each by means of holes in the undulating walls. Hollow ribs are narrowed along their length and where they interconnect, alleviating problems distortion and shrinkage problems. And, the chamber wall which surrounds the injection molding sprue is thinner than the typical wall, to avoid hollowing there.

9 Claims, 3 Drawing Sheets

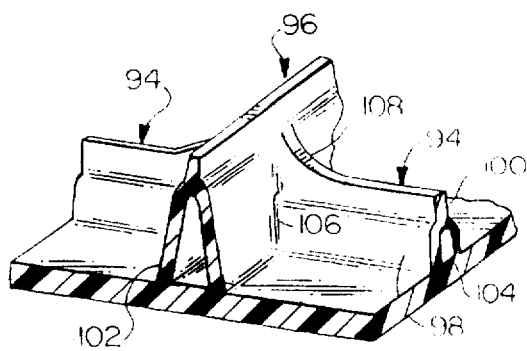
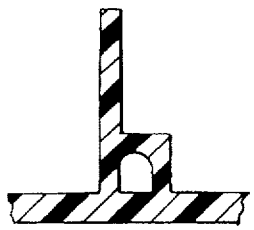
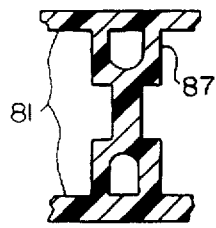
FIG.7  FIG.15  FIG.16
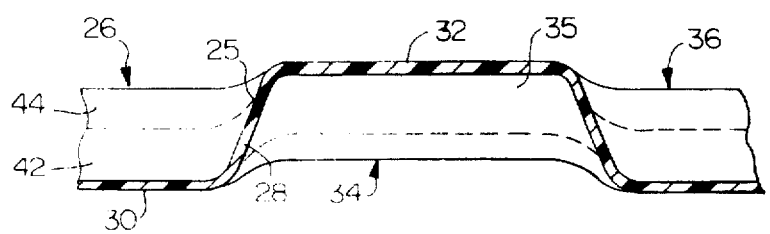
FIG.8
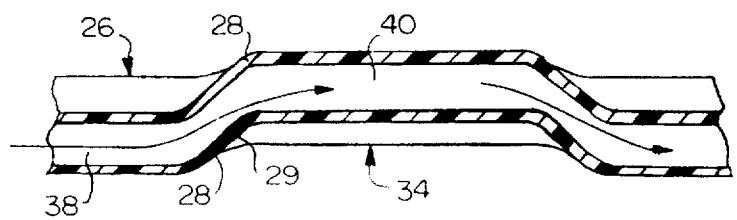
FIG.9

CORRUGATED LEACHING CHAMBER WITH HOLLOW RIBBING

This application is a continuation of application Ser. No. 07/956,602, filed Oct. 5, 1992, now U.S. Pat. No. 5,401,459.

TECHNICAL FIELD

The present invention relates to leaching chambers, in particular to molded thermoplastic articles for dispersing and gathering liquids in soil.

BACKGROUND

Load bearing molded thermoplastic articles for structural applications often have ribs and like features to provide strength. For example, a molded pallet will have an egg-crate pattern of ribs. As another example, a molded arch shaped chamber for dispersing and gathering liquids in the earth, described in U.S. Pat. Nos. 4,559,661 and 5,015,041 (having common inventor and assignee herewith) has ribs in addition to corrugations, so that when buried in the earth it will resist the weight of the earth and vehicles. Such articles are typically made by injecting hot polyethylene into a relatively cold die.

An improved method of making large polyethylene objects like the chambers involves injecting nitrogen or another nonreactive gas into the mold before the thermoplastic hardens. Thus, hollow walls are formed in the articles where they would otherwise be thick. See U.S. Pat. Nos. 4,247,515, 4,234,642, 4,136,220, all to Olabisi, and U.S. Pat. No. 4,101,617 to Friedrich. The technique reduces the injection pressure which is required for flowing plastic to the far reaches of the mold, reduces the amount of polymer needed, and speeds the injection molding cycle time. When ribbed products are made, the thicker cross section ribs will desirably be hollowed.

As the foregoing gas assisted injection molding process is commercially known and is related to ordinary injection molding, many essential principles for product shape and mold design are known. However, there are process limitations which give less than the desired product properties and dimensions. One problem is a tendency of ribs to have areas which are not desirably hollowed out, since gas sometimes pushes molten plastic from opposing directions whereupon it is trapped and forms a block, as described in U.S. Pat. No. 4,234,642. Such a region will not cool as fast as the rest of the adjacent hollow structure, undercutting the expected faster cycle time, or producing localized distortion and surface shrinkage. Another problem occurs, as in the leaching chamber, where a strengthening rib butts against an undulation of the corrugation, insofar as controlling hollowness and obtaining good strength at the butt joint. Still another problem results when residual pressurized gas, trapped in the molded part, upon removal causes wall eruptions at locations which are insufficiently cooled or have very thin walls. Thus, there is a need for improvement in the technology of molding and design for this kind of product and process.

SUMMARY

An object of the invention is to provide gas assisted injection molded chambers having more consistent structure and properties, and better combination of solid and hollow regions. Another object is to minimize the cycle time of making such products while reducing any propensity for distortion at local areas of the molded article.

In accord with the invention, selective areas of a chamber are thinned, compared to the conventional design. In one aspect of the invention, the rib strengthening a chamber wall has a stepped cross section. And, the base of the rib is substantially hollow while the thinner upper part is solid. In the preferred rib the base and upper part are essentially constant width and rectangular in cross section.

In another aspect of the invention, the chamber has an undulating or corrugated surface, with hollow ribs running on both sides, crosswise to the undulating surface. Where the ribs intersect the opposing sides of a corrugated peak (also called the web) of the wall, there is a through-hole; and, the hollow parts of the opposing side ribs connect to one another through the hole.

In accord with another aspect of the invention, a chamber has a grid of intersecting ribs formed by gas assisted injection molding. Many of the ribs are hollow, while certain other ribs are narrower in width and solid; they are alternatively, continuations of the hollow ribs or cross-connecting ribs. In still further accord with the invention, a chamber has a hollow rib running from a sprue, and the chamber wall surrounding the sprue is thinner than the chamber wall elsewhere.

The foregoing improvements embody better management of, or response to, the flow of mold material and gas in the mold which defines the article. They result in a product which is less prone to local distortion and which has more dependable structural strength. The invention is applicable to other articles made of plastic and like-behaving materials.

The foregoing and other objects, features and advantages of the invention will become more apparent from the following description of the best mode of the invention and accompanying drawings.

BRIEF DESCRIPTION OF THE DRAWINGS

FIG. 7 shows two intersecting stepped ribs, one of lesser height than the other.

FIG. 8 shows a side view of the corrugated part of FIG. 2, illustrating how aligned ribs run on the upper and lower surfaces of the corrugation.

FIG. 9 is similar to FIG. 8, showing the ribs in cross section and the connecting of the hollows of each through the web of the corrugation.

FIG. 15 shows in cross section a stepped rib in the shape of an "h".

FIG. 16 shows in cross section a stepped rib having an additional opposing base.

DESCRIPTION

The invention is in part described in terms of an improvement of a leaching chamber described in U.S. Pat. No. 5,017,041, disclosure of which is hereby incorporated by reference. A typical leaching chamber is about 3 ft wide, 6 ft long, and ranges in height from 12–25 inch; it is made of high density polyethylene (Specific Gravity greater than 0.95), with chopped fiberglass, and weighs about 26–36 lb. It has a corrugated arch shape; strengthening ribs run both lengthwise and along the arch width, on the exterior and interior.

The article is made by a commercially known gas assisted injection molding process generally in accord with the teachings of the aforementioned Olabisi '515 patent at columns 3 and 4 and Friedrich patent at columns 2–4, the disclosures of which are hereby incorporated by reference. The process in columns 2–4 comprises injecting a quantity of polyethylene into a water cooled mold clamped in an injection molding machine, to partially fill the mold. Shortly thereafter, while the plastic is still hot and flowable, nitrogen gas is injected to push the molten plastic to the far reaches of the mold. Flow of gas desirably hollows out the larger cross sections of the part within the mold. After sustaining the pressure and allowing the part to cool, the gas pressure is released and vented. The mold is then opened and the part is removed for further cooling to room temperature. To make an article as large as the leaching chamber, multiple injection ports are used. Smaller articles may require only one injection port. Of course, sprue systems, runners, etc., may be used to distribute plastic from a single central port in some applications.

In the description which follows, for simplicity, repetitious distinction is not made between the mold which defines the article and the article which is the product of the mold. It is obvious to the artisan what the connection is, in that in injection molding the mold replicates the part, other than for unwanted distortions or defects and slight overall dimensional deviations as a result of final cooling.

Figure 1:
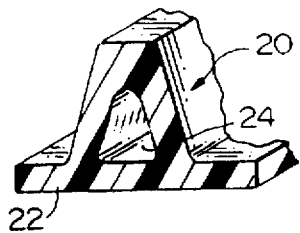
FIG. 1 shows a rib cross section of the prior art.

FIG. 1 shows a typical prior art rib in cross section. The truncated triangle cross section rib 20 is mounted to strengthen a wall 22; the hollow interior 24 corresponds only loosely to the rib shape, especially at the top where the relatively cold mold has the greatest effect owing to the part surface area to volume relationship. The plastic, becoming more viscous, resists the flow of gas. The shape and degree of hollowness of the rib depends on the mold, gas and polymer parameters and usually will vary along the length of a rib, especially as the rib intersects other parts of the molded structure. The prior art shows in many instances hollows that have rather little conformance with the shape of the rib or other section that contains them.

Figure 2:
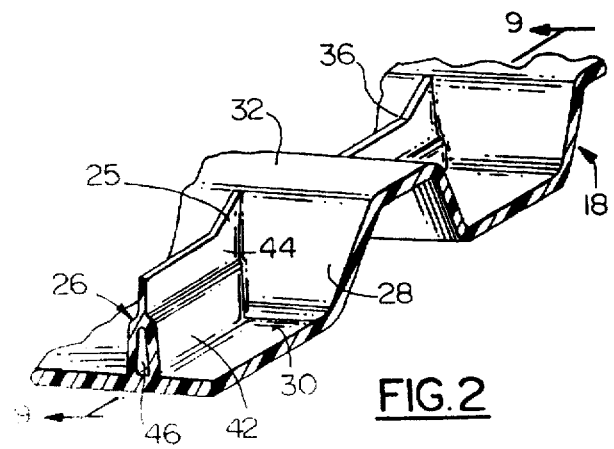
FIG. 2 shows a portion of the top arch of a corrugated arch shaped leaching chamber, having ribs running crosswise to the undulating surface.
Figure 14:
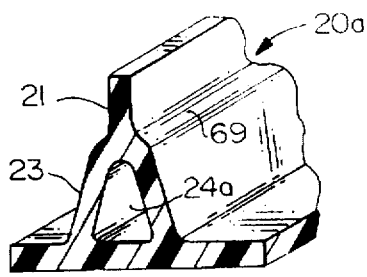
FIG. 14 shows a rib having a base like that of the prior art rib of FIG. 1, illustrating how the upper part increases the size and shape of the hollow.

A stepped rib of the present invention has an upper part mounted atop the base, and the effect of such is illustrated by comparing the base 23 of stepped rib 20a in FIG. 14 with the rib 20 of FIG. 2; rib base 23 has essentially the same size as in the rib 20. The upper part 21, containing hot plastic during molding, retards the cooling of the top portion of the base. As a result the gas injection will hollow the base more than if the upper part was not present. Thus the interior hollow 24a substantially conforms with the shape of the base 23, more than is the case for ribs in the prior art. This is an advantage in that more hollowing of any section reduces weight and facilitates delivery of plastic and gas to points along the rib length. Of course, the rib 20a also has an advantage over the rib 20 in that it has a section modulus which is more favorable owing to the upper part.

Figure 3:
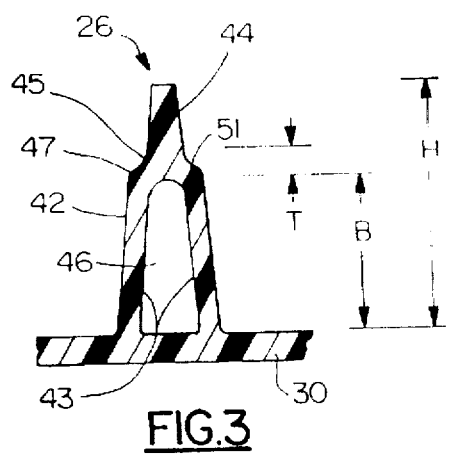
FIG. 3 shows in cross section a most preferred stepped rib having a solid upper part and hollow base mounted, both essentially rectangular, joined by a transition zone comprised of two small radius curves.

A typical stepped rib 26, shown in more detail in FIG. 3, has a hollow base 42 and an integral narrower width solid upper part 44. The base 42, resting on a wall 30, has a height B and an oblong hollow cavity 46 which substantially conforms to the shape of the base. The relatively severe cross section or width change, between the base and upper part, along the relatively short transition zone vertical axis length T ensures injected gas will only hollow the wider base, and not the upper part or transition zone. The narrowness of the upper part is such as to cause polymer in that part to sufficiently cool and become more viscous, so it resists flow of the injection gas. The gas preferentially flows through the wider, greater unit volume-to-surface area ratio, and therefore warmer, base. Since the base is warmer than the upper part, the viscosity of the plastic there is less than in the upper part. The base cools with the rest of the rib and article, but its cooling is sufficiently small, so that the increase in viscosity of the plastic there does not prevent flow of gas therethrough. Thus, the base is made substantially hollow while the upper part is solid, even when temperature and pressure vary somewhat within the mold along the rib length. The base walls 34 vary in thickness, being thicker near the transition zone, but they nominally define an interior space which is substantially rectangular like the base cross section, albeit with a rounded top end.

A rib usually serves both a structural function and a polymer/gas distribution function. Accordingly, the proportions of the height and width of the upper part and base parts, may vary substantially. A preferred rib like that of FIG. 3, used on a leaching chamber having a nominal ⅛ inch wall, will have an overall height H of about 1.4–1.7 inch; a nominal rectangular cross section base having a width of about 0.3–0.5 inch; and, a nominal rectangular cross section upper section width of about ⅛ inch and a height of about ¼ to ½ inch. (The widths of each part are essentially constant, within the context of having a mold draft of 0–5 degree per side.) The transition zone between the base and upper part will be about 1/16 to ⅛ inch in vertical length, comprised of a fillet 45 and a base top edge curve 47, each of about 1/32 inch radius, connected by a fairing-in surface 51 that is nearly perpendicular to the height axis of the rib. Thus, the transition zone length is less than about 10 percent of the overall height. Typically, the walls 43 of the base are 1/16 to ⅛ inch thick, most typically and preferably about 3/32 inch.

In work thus far on large structural objects, a preferred rib will have the following dimensions and proportions: The base will be about 2 to 4, preferably 3, times wider than the upper section; and, the walls of the base will be between about ¼ to 1 times the width of the upper section. For example, if the upper part is ⅛ inch wide, the base will be ⅜ inch wide and the base walls will be 1/32 to ⅛ inch thick. Of course, the wall width (and hollowness) will vary somewhat along the length of the rib, according to variation in influential parameters (polymer temperature, gas pressure, etc.) at any particular point.

Preferably, the height B of the base will be between about 30 and 85 percent, preferably between about ⅓ and ⅔, of the height H of the overall rib. Thus, by example, a 1.5 inch high rib will have a base which is 0.5–1 inch high. Smaller upper parts are feasible; the rib upper part may have a height equal to its width, which width is less than the width of the base. By example, a minimal size upper part might be ⅛ inch wide and ⅛ inch high.

Figure 4:
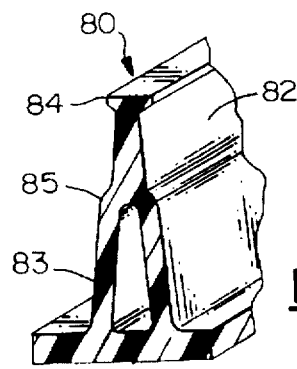
FIG. 4 shows in cross section a stepped rib having tapered walls and an angled surface transition zone.

The cross section shapes of the preferred base and upper part described above and shown in FIG. 3 are essentially rectangular, i.e., they are constant in width, making allowance for the mold draft. Non-rectangular shapes are within the scope of the broad invention. For example, FIG. 4 shows a rib having a more complicated cross section within the scope of the invention. The rib 80 has somewhat tapered base 83 and upper part 82; the latter is surmounted by a small flange 84. The transition zone is characterized by a surface 85 angled upwardly from the topmost edge of the base toward the rib vertical axis. This contrasts with the more nearly horizontal analogous surfaces 69,71 of the ribs shown in FIGS. 14 and 6. Transition zone surfaces, flat or curved, nominally angled at less than 45 degrees from the horizontal are preferred, particularly in ribs of the preferred dimensions described above. The choice of shape depends in part on the widths of the base and upper part adjacent the transition zone.

The transition zone is a portion of the rib wherein there is a substantial change in unit cross section—or more simply, width—along the vertical axis. The transition zone may vary in severity in the ways described herein, so long as it is combined with both a base having sufficiently great width at its upper end (near the transition zone), to produce the substantial hollowness of the rib base part and a rib upper part having sufficiently small width at its lower end (near the transition zone), to produce the solidity of the upper part. The preferred transition zones will be of a shape that results in their being solid as well.

Figure 5:
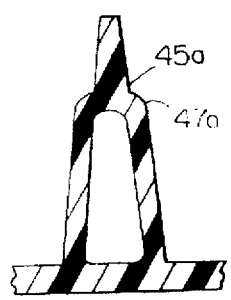
FIG. 5 shows the cross section another stepped rib, where the transition zone is comprised of curved top edges on the base top.
Figure 6:
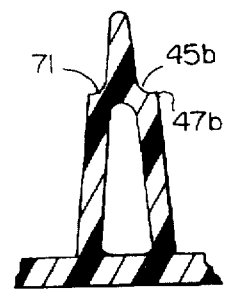
FIG. 6 shows the cross section of another stepped rib, where the transition zone is comprised of curves or fillets at the base of the upper part.

FIG. 5 and 6 illustrate other variations of transition zones. The transition zone of FIG. 5 rib is comprised of a curve at the upper edge 47a of the base and a "zero radius" (i.e., minimum technically feasible radius) or inside corner 45a at the bottom of the upper part. FIG. 6 shows a zero radius at the upper edge 47b and a curve at the inside corner 45b. Of course, zero radii at both places would also comprise a transition zone.

Another variation within the invention is shown in the rib of FIG. 15, where the upper part is offset from the center of the base, so the rib has an "h" cross section. Still another variation is shown in FIG. 16, where the rib has another "base" 87 at atop the upper part, and where the cross section of the part is shaped like an "T". FIG. 16 may also be characterized as comprising two opposing ribs joined at the tops of their upper parts. The construction shown in FIG. 16 will be useful at the periphery of articles, when the wall portions 81 on one side will be omitted; changing to the FIG. 14 "h" rib design for such will produce a straight sidewall periphery.

FIG. 2 shows how stepped ribs 26, 36 strengthen a section 18 of the top of a leaching chamber having an arch shape. In the chamber, corrugations run along the arch shape, transverse to the chamber length. The corrugations impart rigidity in the transverse direction, while a multiplicity of ribs like ribs 26,36 provide strength in the lengthwise or axial direction. (Additional, solid ribs mostly, along with some hollow ribs, run perpendicularly to ribs 26, 36 to strengthen further the relatively flat portions of the peaks and valleys. For simplicity they are not shown here, but they are discussed below.

FIG. 7 shows an advantage of the stepped rib shape, as when a stepped rib 94 perpendicularly intersects another stepped rib 96 having a comparatively larger hollow base 102. When one hollow rib intersects another, the wall of the intersected rib will have a hole in it and be weakened. In FIG. 7 the smaller rib 94 has a base 98 with a hollow 104 and a solid upper part 100. The sidewall of the base 102 of the larger rib is penetrated and thus weakened where the hollow 104 intersects it, at the joint 106. The effect of this weakening is lessened by both the fact of the solid upper part 100 and by the upper part being sloped upward at gusset 108. Thus, the solid upper parts of the ribs are joined, obtaining good solid-to-solid structural connection.

Another mechanical advantage of the stepped rib is evident when it is used on a corrugated leaching chamber and other structures with undulating surfaces. The advantage lies again in having the solid upper part. As shown at FIG. 2, the rib 26 intersects an undulating wall surface, namely the web 28 which connects a valley corrugation 30 and a peak corrugation 32. Because the rib height is less than the web height the solid rib upper part 44 is sloped upward to the top of the peak by a gusset 25. The stepped rib has greater section modulus than a rib lacking the upper part; and confining the hollowness to the base provides more integrity at the web-rib joint, as for the intersection of two ribs, previously described.

FIGS. 8 and 9, side views of the FIG. 2 structure, reveal another typical strengthening rib 34 inside the peak corrugation. The rib 34 is axially aligned with the exterior rib 26, as well as with rib 36 in the next valley. The stepped ribs 26, 34, 36 on the upper and lower surfaces are sized and curved at the web, so that, e.g., hollows 38, 40 of the bases 42, 35 connect. Thus, on injection, polymer and hollowing gas flow, as indicated by the arrows, from rib 26 to rib 34, through hole 29 in the wall of the web and finally to other regions, e.g., the end of the mold and part. Thus, the web will be made stronger than it would be if the ribs were not stepped but were of the same height and wholly hollow, or if the ribs where comprised only of the base portions. Of course, the principle of this aspect of the invention—having hollowed ribs which connect through the undulating surface—can nonetheless be practiced with plain and unstepped ribs, but with less advantageous result.

Figure 10:
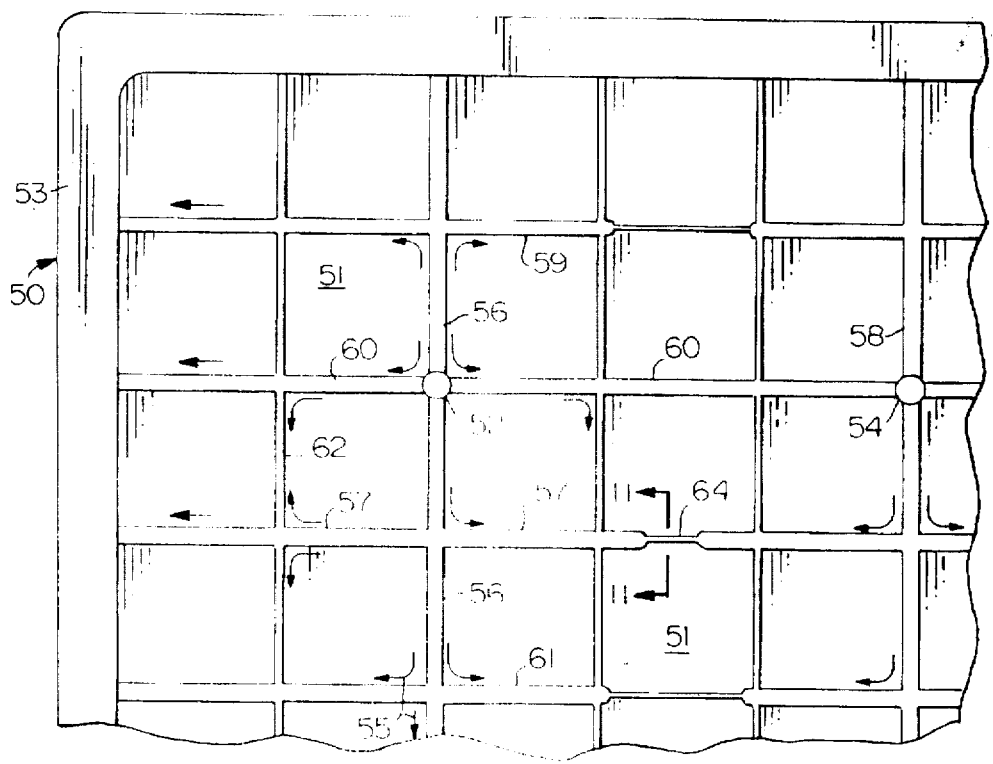
FIG. 10 shows a part of the bottom of a rectangular pallet having intersecting ribs, some of which are locally narrowed and solid.

As indicated in the Background, when the ribs are uniformly sized there is some tendency for plastic to be pushed along a rib by the gas injection, and then to meet other plastic pushed opposingly, thus forming solid regions in what would otherwise desirably be hollow ribs. These solid regions are slower cooling solid portions, and they tend to be sunken in and distorted in the final product. FIG. 10 shows part of an article in which this problem has been overcome by a combination of thick and thin ribs. The Figure shows the underside of a part 50 of a pallet having an array of ribs, e.g., 56, 62, 58, 60, 64, 59, supporting a flat upper surface 51. The ribs terminate at a circumscribing pallet rim 53. Some ribs are intentionally made larger in cross section than others. Arrows 55 indicate the direction of typical gas flow in the mold when the part is formed. Of course, it is the nature of the process that the plastic first injected does not fill the extremities of the mold, and the gas accomplishes this purpose, pushing the plastic into thinner sections, and hollowing it in thicker sections, e.g., ribs.

Figure 11:
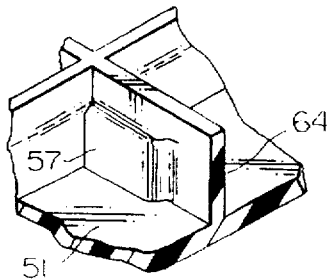
FIG. 11 shows a detail of part of a rib in FIG. 10, where the rib is narrowed along the part of its length where it is solid.

To fill the mold, plastic, followed by gas, is injected at spaced apart port/sprue locations 52, 54. For example, when injected, the gas from the port 52 flowing through rib 56 will tend to push polymer also through the perpendicular running ribs, e.g., 57, 59, 60, 61, of course, to the extent they are not so thin and already filled that the plastic has become too viscous to move further. The material in these perpendicular ribs will tend to flow through ribs connecting them. If hypothetically, an article was made with all ribs equally sized and aimed at carrying gas, some would end up being solid. Such result might be calculated or empirically determined. For an example, suppose material coming from ribs 60, 57 into rib 62 would make 62 filled and solid. Thus, in the practice of the invention, that rib is made narrow. Likewise, when only a part of a rib would tend to be solid, only a portion thereof would need be narrowed. This is illustrated in FIG. 10, where part 64 of a rib 57 is made narrow. FIG. 11 shows the part in better detail.

Thus, ribs are narrowed where opposing flows meet to form solid ribs. The narrow ribs in these regions, having less mass of hot plastic will thus be better cooled—nominally as fast as the other ribs which are hollowed out by the gas. Not all the ribs where the opposing flows meet will tend to be solid, as it depends on the things connecting to the ribs. For instance, rib 60 running directly between sprues 52,54 is shown unnarrowed, because the temperature and flow conditions, including flow into branch ribs, are such that the rib does not tend toward being solid. Again here, the stepped rib is preferred but the principle will be applicable to other shape ribs. The invention will be useful for other patterns of ribs, and for like features. For example, if the rim 53 which circumscribes tends toward having a solid portion in an otherwise hollow structure, the local portion may be thinned.

The typical leaching chamber described earlier will preferably employ the combination of solid and hollow ribs just described. In it, the hollow ribs will predominately run lengthwise to the chamber, and perpendicular to the corrugations and arch cross section. See the earlier description of how stepped ribs are applied to the chamber. Ribs running transversely, or along the arch length, will be predominately solid. Some transversely ribs will carry gas, of course, from the injection ports/sprue regions, and between the lengthwise ribs.

Another problem is found when gas is injected at the sprues or injection port locations 52, 54, and a desired solid wall adjacent to a port is found to be hollow or distorted. It appears that the greater heat flux in the sprue region, with resultant heating of the mold and slower cooling of plastic, enables gas to undesirably flow locally through the walls in addition to the ribs. Walls will be undesirably thinned and weakened, and worse, may bulge if there is any retained pressurized gas and it pushes outwardly as the still warm part is removed from the mold.

Figure 12:
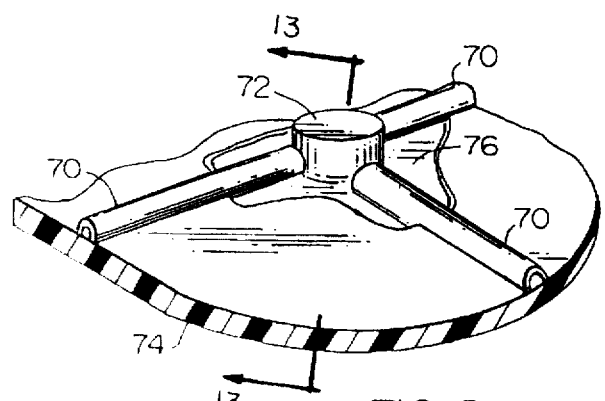
FIG. 12 shows part of an article having ribs running from a sprue, and a thinned wall surrounding the sprue region.
Figure 13:
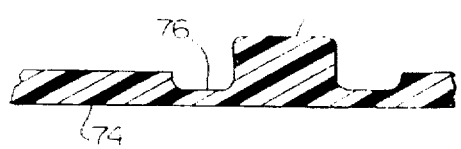
FIG. 13 shows a cross section of the sprue and wall of FIG. 12.

To overcome this problem the mold and the resultant wall of the article are thinned around the boss or sprue formed by the port, as shown in FIG. 12 and 13. Hollow ribs 70 radiate from the sprue 72 across the solid wall 74 of a portion of an article. Surrounding the boss is a thinner wall region 76. It will be noted that the thin region 76 extends further from the sprue in the direction the ribs run, since the heating is greater in these directions and it is undesirable to unduly thin the wall where not required, for structural reasons. The resultant thinned area 76 has a cloverleaf like appearance, with the number of leaves a function of the number and direction of ribs. As an example, the wall 74 will have a typical thickness of 0.12–0.15 inch, and the thinned area 76 will be 1/32 inch or more thinner—about 20–25% thinner—with a typical thickness of 0.07–0.12 inch. The thinned area will extend about 2 inch along the length of a ⅛ inch wide by 1.5 inch high rib running from a ½–¾ inch diameter sprue.

While the invention has been described with respect to the molding of polyethylene articles it will be applicable to the molding of other organic and inorganic materials, as mentioned in the Olabisi patents, and combinations of materials.

Although only the preferred embodiment has been described with some alternatives, it will be understood that further changes in form and detail may be made without departing from the spirit and scope of the claimed invention.

We claim:

1. In a molded leaching chamber for dispersing liquids in soil, of the type having an arch shape cross section, corrugations forming an undulating wall, and strengthening ribs, the improvement which comprises:

an undulating chamber wall having opposing first and second surfaces, and a rising wall section with a hole therethrough;

a first rib having a hollow interior portion running along the length thereof; the rib running along the first surface of the undulating wall, intersecting the rising section of the wall in vicinity of the hole; and, a second rib having a hollow interior portion running along the length thereof; the rib running along the second surface of the wall; the second rib intersecting the surface of said rising section of the wall in vicinity of the hole;

the hollow interior portion of the first rib connected by means of the hole with the hollow interior portion of the second rib.

2. The chamber of claim 1 characterized by the first and second ribs being stepped ribs; each rib comprised of a base of a first width containing in its interior a hollow, a solid upper part of a second width which is less than the first width, integrally attached to the base, and a transition zone between the base and upper part of the rib; wherein the hollows of the bases of the ribs are connected through the hole in the wall.

3. The chamber of claim 2 characterized by a rib base which is substantially rectangular in cross section.

4. In a leaching chamber, for dispersing liquids in soil, of the type formed by gas assisted injection molding of moldable material, the improvement comprising:

a solid wall predominately of a first thickness;

a sprue, formed on the surface of the wall, said sprue comprising the point where moldable material with gas was injected during gas assisted injection molding;

a hollow rib attached to the wall and running from the sprue;

said wall having a portion of a second thickness, smaller than said first thickness, surrounding and locally extending away from the sprue, to thereby provide the wall with minimized shrinkage adjacent the sprue.

5. In a molded leaching chamber of the type made by gas assisted injection molding, the chamber having a wall with a rib running across a surface of the wall, the rib having a length, wherein the gas assisted injection molding process tends to make said rib have a hollow interior along most of the rib length, but for a local length section which is solid; the improvement which comprises: a portion of the rib comprising three connected sections; a fully solid section; two rib sections having hollow interiors, one each lying along the rib length on either side of the fully solid section; the fully solid section narrower in width than the widths of either of the rib sections with hollow interiors, to thereby reduce shrinkage in the fully solid section.

6. The chamber of claim 5 wherein the rib running along the rib length and having a hollow portion is a stepped rib comprised of a hollow base of a first width and a solid upper part of a second width which is less than the first width, attached to the base; wherein said rib section which is solid and narrower has a shape nominally like that of said stepped rib, except that the base is narrower and solid.

7. The chamber of claim 6 wherein the solid and narrower rib portion runs transverse to the portion of the rib having the hollow interior.

8. In a molded leaching chamber, of the type having an arch shape wall with strengthening ribs running across the surface thereof, the improvement which comprises:

the chamber having first and second stepped cross section strengthening ribs running along the surface thereof to intersect each other; the first rib comprised of a substantially rectangular base having a first width and a hollow interior; a solid upper part having a second width which is less than said first width; a solid stepped transition zone connecting the base and upper part; the second rib intersecting the first rib; the second rib shaped similarly to the first rib, but smaller compared thereto; the hollow interior and solid upper part of the first rib respectively connected to the hollow interior and solid upper part of the second rib; the connection of said upper parts providing strength to the rib intersection.

9. The chamber of claim 1 wherein the second thickness portion of the wall extends away further from the sprue in vicinity of where the hollow rib runs from the sprue, compared to the distance said portion extends from the sprue at locations removed from vicinity of the hollow rib.

* * * * *